United States Patent [19]

Mrocca

[11] Patent Number: 5,142,835
[45] Date of Patent: Sep. 1, 1992

[54] REACTION INJECTION MOLDED DOOR ASSEMBLY

[75] Inventor: Mark M. Mrocca, Dearborn, Mich.

[73] Assignee: Taylor Building Products Company, West Branch, Mich.

[21] Appl. No.: 596,895

[22] Filed: Oct. 12, 1990

[51] Int. Cl.⁵ .............................................. E04C 2/20
[52] U.S. Cl. .................. 52/309.12; 52/309.9; 52/309.7; 52/309.11; 52/309.14
[58] Field of Search .............. 52/309.7, 309.9, 309.11, 52/309.12, 309.14

[56] References Cited

U.S. PATENT DOCUMENTS

| | | | |
|---|---|---|---|
| 2,728,702 | 7/1951 | Simon et al. | 52/309.9 |
| 2,849,758 | 9/1958 | Plumley et al. | |
| 2,871,056 | 1/1959 | Levitt . | |
| 2,890,977 | 6/1959 | Bayer et al. . | |
| 2,924,860 | 2/1960 | Parham et al. . | |
| 3,225,505 | 12/1965 | Lytz . | |
| 3,250,041 | 5/1966 | Anger . | |
| 3,299,595 | 1/1967 | Munk . | |
| 3,498,001 | 3/1970 | Mac Donald . | |
| 3,512,304 | 5/1970 | Meuret . | |
| 3,546,841 | 12/1970 | Smith et al. . | |
| 3,593,479 | 7/1971 | Hinds et al. . | |
| 3,772,241 | 11/1973 | Kroekel . | |
| 3,950,894 | 4/1976 | DiMaio . | |
| 3,961,012 | 6/1976 | DiMaio . | |
| 4,022,644 | 5/1977 | Smith . | |
| 4,072,548 | 2/1978 | Gersow et al. | 52/309.9 |
| 4,132,042 | 1/1979 | Di Maio . | |
| 4,265,067 | 5/1981 | Palmer | 52/309.9 |
| 4,272,618 | 6/1981 | Dominquez et al. . | |
| 4,356,230 | 10/1982 | Emanuel et al. . | |
| 4,435,349 | 3/1984 | Dominquez et al. . | |
| 4,444,703 | 4/1984 | Dominquez et al. . | |
| 4,550,540 | 11/1985 | Thorn . | |
| 4,562,032 | 12/1985 | Gaudreau . | |
| 4,572,856 | 2/1986 | Gembinski . | |
| 4,731,427 | 3/1988 | Younes . | |

FOREIGN PATENT DOCUMENTS

| | | |
|---|---|---|
| 1420244 | 1/1976 | United Kingdom . |
| 1487309 | 9/1977 | United Kingdom . |
| 2044316 | 10/1980 | United Kingdom . |

*Primary Examiner*—David A. Scherbel
*Assistant Examiner*—Wynn E. Wood
*Attorney, Agent, or Firm*—Myron B. Kapustij; Malcolm L. Sutherland; Edgar A. Zarins

[57] ABSTRACT

A door assembly comprising a pair of relatively thin reaction injection molded skins adhered on opposite sides of a perimeter frame. A core comprised of a relatively rigid plastic foam is disposed within the frame. The reaction injection molded skins comprise a composite containing a reaction injection molded resin such as a polyurethane resin, and a reinforcing fibrous mat such as a glass mat which is impregnated with said resin.

39 Claims, 3 Drawing Sheets

REACTION INJECTION MOLDED DOOR ASSEMBLY

BACKGROUND OF THE INVENTION

This invention relates generally to a lightweight, dimensionally stable, impact resistant, strong and rigid door assembly which is resistant to warpage.

For many years residential exterior doors have been fabricated from wood with attendant disadvantages from the standpoint of insulating characteristics and tendencies to warp or delaminate. Recently, door assemblies having outer panels or skins comprised of plastic and other materials have been coming into increased use. U.S. Pat. No. 4,550,540 discloses a door assembly having a frame, a foamed core, and polyester compression molded skins. U.S. Pat. No. 4,152,876 discloses a metal faced door comprising a frame, a foamed core, and metal faces. However, these doors suffer from several disadvantages. Metal faced doors are relatively heavy and the metal faces need to be preformed to rather exacting dimensional standards to properly fit the frame. The doors having skins of polyester, due to the relatively poor resistance to impact of polyester resins, generally are somewhat susceptible to damage, e.g., breakage or cracking of the skins, when subjected to impact.

The door assemblies of the instant invention overcome the deficiencies and problems associated with presently available doors. They are resistant to warpage; they have insulating properties; they are able to withstand relatively high impact forces without breaking or cracking; they are relatively light weight; and they are easy to assemble.

SUMMARY OF THE INVENTION

A composite skin faced door comprising a frame defining a central cavity, a pair of opposed composite skins disposed on opposite sides of said frame, and a synthetic resin foam core disposed in said cavity. The relatively thin skins are core disposed in said cavity. The relatively thin skins are adhered on opposite sides of the frame, preferably a wooden frame, thereby enclosing the door interior which is filled with a relatively rigid plastic foam.

The composite skins are comprised of a fibrous mat impregnated with a reaction injection molded thermoset resin, preferably a rigid thermoset polyurethane resin. The exterior sides of the skins may contain a coating thereon, and may also have a texture molded therein.

The foam core is formed of a relatively rigid plastic foam such as, for example, a relatively rigid urethane foam or a polystyrene foam.

The frame is comprised of horizontal rails, preferably comprised of wood, and vertical stiles, also preferably comprised of wood. In a preferred embodiment both rails are comprised of a plurality, preferably at least two and more preferably three, plies of wood bonded together. The stile which is adapted to receive the lock mechanism is also comprised of a plurality, preferably at least two and more preferably three, plies of wood bonded together. The stile adapted to receive the hinges is comprised of one piece or ply of wood.

The skins are adhesively bonded to at least the frame and preferably to both the frame and the core.

The door of the instant invention is light weight yet strong, resistant to excessive warpage and deflection caused by temperature differentials and moisture absorption, and limits heat loss due to the presence of the foam core which functions as insulation as well as adding rigidity and strength to the door.

DESCRIPTION OF THE DRAWINGS

For the purpose of illustrating the invention there is shown in the drawings a preferred embodiment of the invention, it being understood, however, that the instant invention is not limited to the precise arrangements shown in the drawings.

DESCRIPTION OF THE PREFERRED EMBODIMENT

Figure 1:
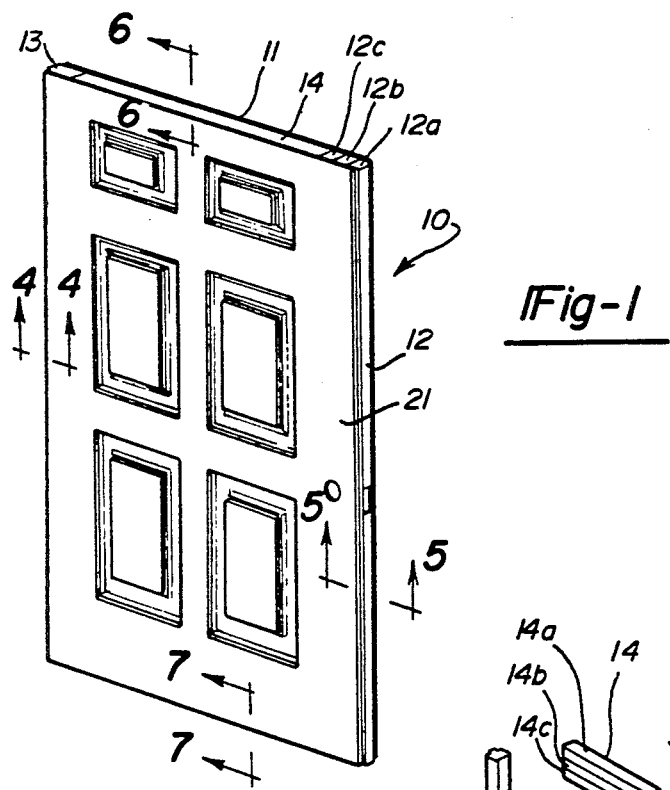
FIG. 1 is a front perspective view of the door assembly according to the present invention.

Referring to the drawings the door of the instant invention is indicated by the reference numeral 10 in FIG. 1. The door is comprised of a perimeter frame 11, a pair of composite door panels or skins 21, 22 mounted on opposite sides of frame 11, and a foam core 30 which is disposed in the interior of frame 11.

Figure 3:
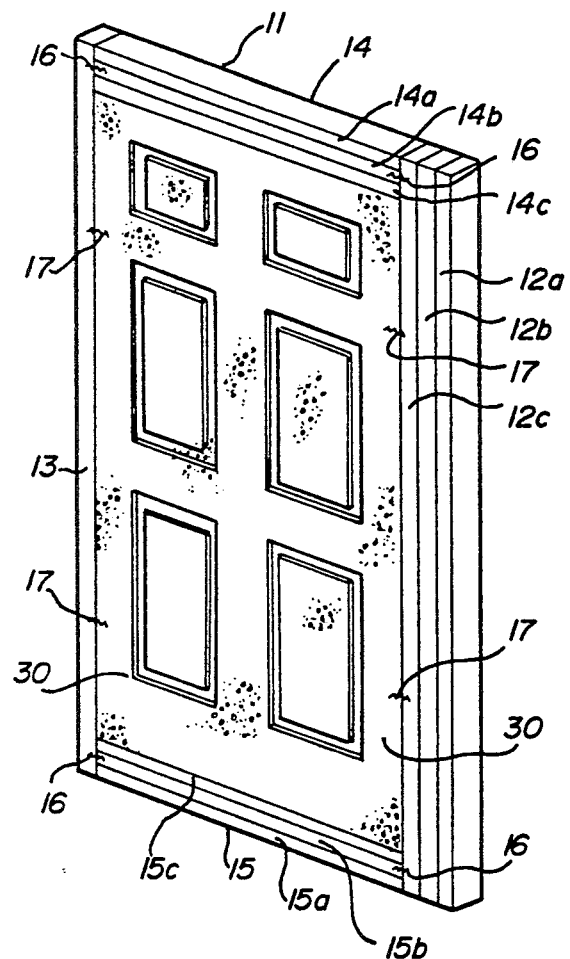
FIG. 3 is a perspective view of the frame with the core mounted therein.
Figure 4:
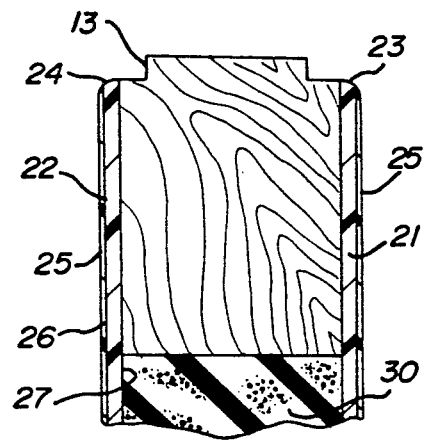
FIG. 4 is an enlarged fragmentary section view taken along line 4—4 of FIG. 1.
Figure 5:
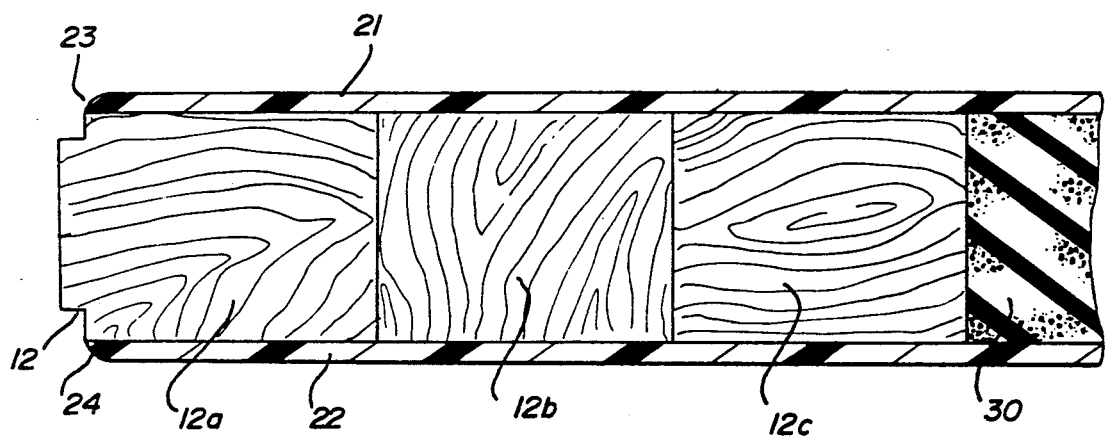
FIG. 5 is an enlarged fragmentary section view taken along line 5—5 of FIG. 1.

Frame 11 comprises a pair of vertical stiles 12, 13 and a pair of horizontal rails 14, 15. The stiles and rails are preferably wood and are comprised of at least one wood member or ply. In the preferred embodiments of the instant invention, as illustrated in the drawings, the rails 12, 13 and the stile 12 are of multi-ply construction, preferably at least two plies and more preferably three plies, while the second stile 13 is of a single ply construction. Referring to FIGS. 3 and 4 the second stile 13 is comprised of a single piece of finger-jointed pine which is generally from about 1 to about 2 inches, preferably about 1⅜ inches wide and from about 1 to about 2 inches, preferably about 1 5/16 inches thick. This second stile is adapted to receive the door hinges. Referring to FIGS. 3 and 5, the first stile 12 is comprised of three pieces or plies of finger-jointed pine 12a, 12b and 12c each piece being generally from about 1 to about 2 inches, preferably about 1⅜ inches wide and from about 1 to about 2 inches, preferably about 1 5/16 inches thick. Each of the three pieces are bonded or glued together to form said stile 12. This first stile is adapted to receive the door knob and latching mechanisms.

Figure 2:
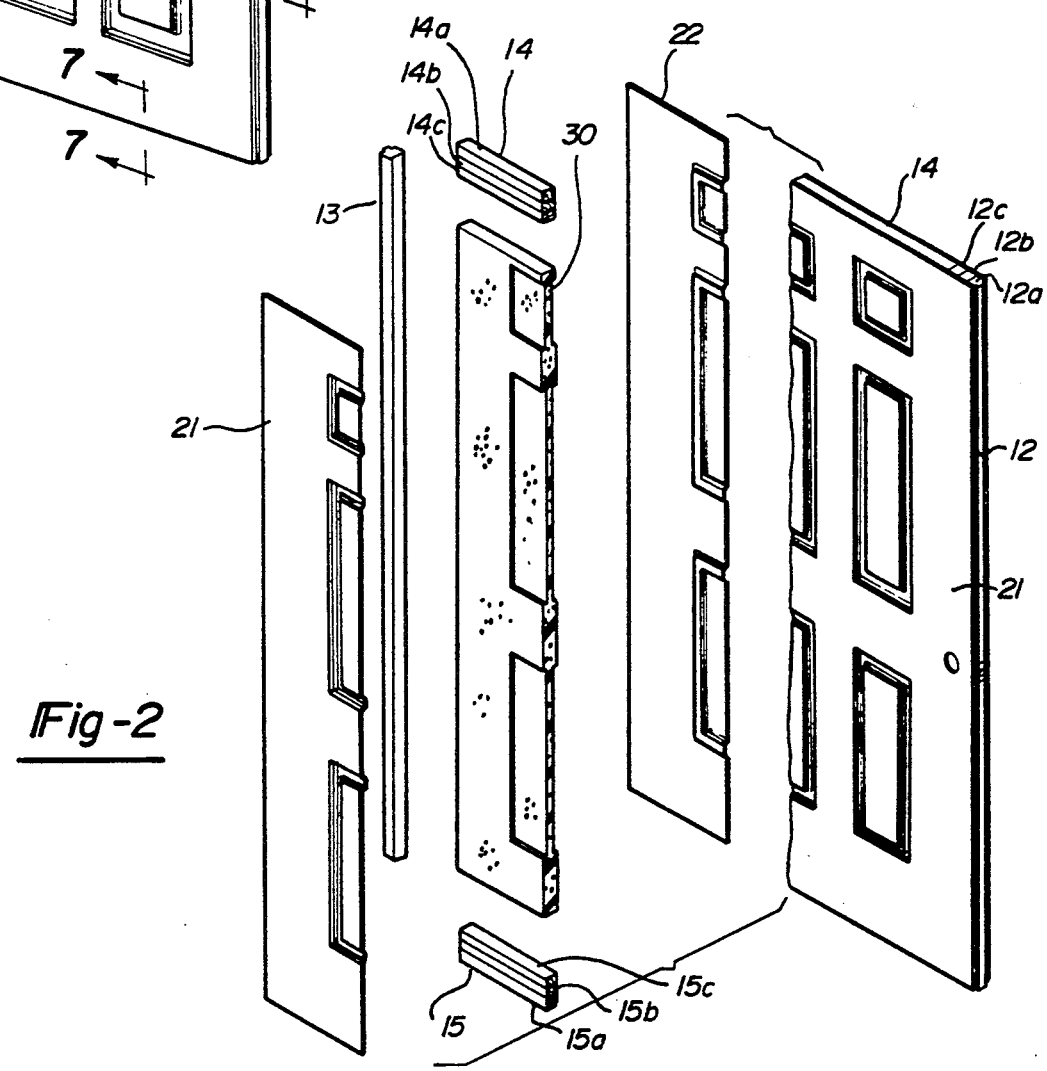
FIG. 2 is a partial exploded perspective view of the door assembly.
Figure 6:
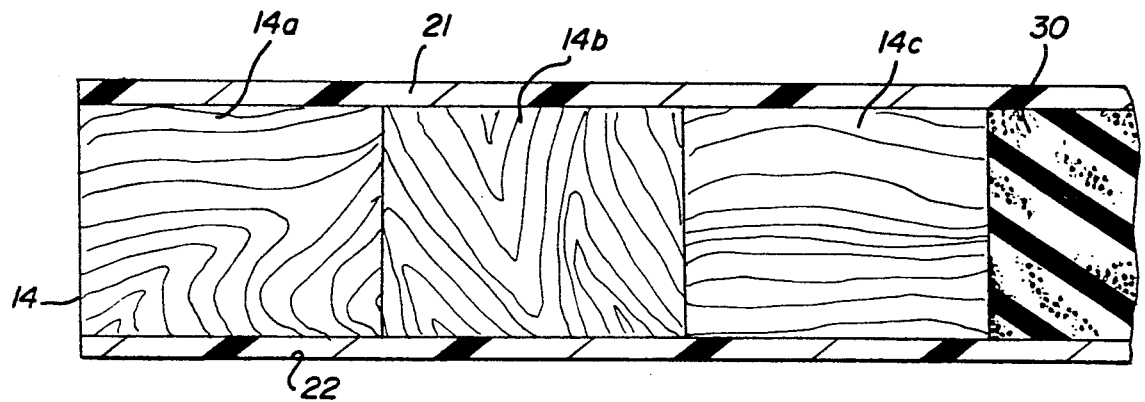
FIG. 6 is an enlarged fragmentary section view taken along line 6—6 of FIG. 1.
Figure 7:
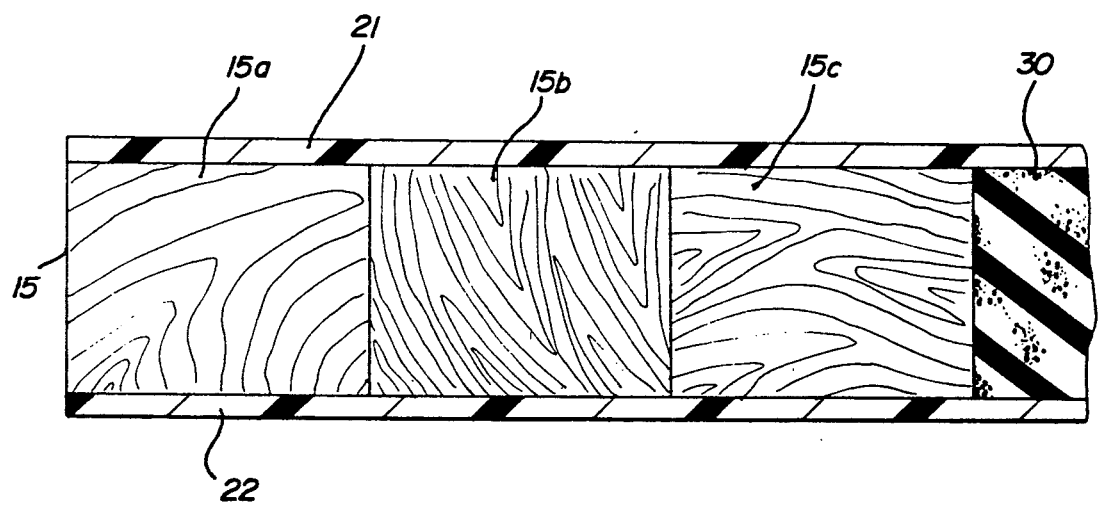
FIG. 7 is an enlarged fragmentary section view taken along line 7—7 of FIG. 1.

The horizontal rails 14 and 15, as illustrated in FIGS. 3, 6 and 7, are each comprised of three pieces or plies of finger-jointed pine, 14a-c and 15a-c, each piece being generally from about 1 to about 2 inches, preferably about 1⅜ inches wide and about 1 5/16 inches thick. Each of the three pieces are bonded or glued together to form a rail. Rail 14 is the top rail forming the top of the frame 11, while rail 15 is the bottom rail forming the bottom of frame 11. The stiles 12 and 13 are joined to rails 14 and 15 by either mechanical joining means such as fasteners, or chemical means such as bonding or glue, or by both. In FIG. 2 the joining means comprise convoluted or corrugated staples 16.

A foam 30 fills the interior of the frame 11. The foam core is more fully described hereinafter, but generally comprises a rigid plastic foam having a density of from about 1 pound per cubic foot to about 5 pounds per cubic foot. The core 30 may be joined to the frame 11 by mechanical means such as various types of fasteners, by chemical means such as adhesives, or both. In FIG. 3 the core 30 is shown joined to frame 11 by mechanical fasteners, e.g., corrugated staples 17. The foam core may be preformed and then inserted into the frame, or it may be foamed-in-place. The foam core 30 functions both as insulation and to add strength and stiffening to the door assembly.

Skins 21, 22 are more fully described hereinafter. They are, however, comprised of a composite containing a fibrous mat impregnated with a relatively rigid reaction injection molded thermoset resin. The skins have an inner surface or face 27 and an outer or exterior surface or face 26. As illustrated in FIG. 4, the skins may optionally have a thin coating 25, more fully described hereinafter, adhered onto their exterior face 26.

The skins 21 and 22 are firmly adhered or bonded to the stiles 12, 13, rails 14, 15 and core 30 by means of an adhesive such as, for example, a contact adhesive or a hot melt adhesive, e.g., an epoxy adhesive or a polyurethane hot melt moisture cure adhesive marketed by National Starch Corp. as #70.7254.

As illustrated in FIGS. 4 and 5 the outer edges 23 and 24 of the skins adhered to the stiles 12 and 13 are chamferred.

Each of the skins 21, 22 is comprised of high strength composite comprised of a reinforcing mat impregnated with reaction injection molded (RIM) polymers, preferably polyurethane resins, more preferably relatively rigid polyurethane resins. The composite is comprised of from about 15 to about 60 weight %, preferably from about 20 to about 50 weight %, and more preferably from about 25 to about 35 weight % of reinforcing mat.

Reaction injection molding (RIM) is a process by which highly chemically reactive liquids are injected into a closed mold, usually by impingement, where they polymerize rapidly to form a coherent, molded article. The RIM processes involve a rapid reaction between catalyzed isocyanate reactive component such as polyether or polyester polyol and polyisocyanate constituents. The constituents are stored in separate tanks prior to molding and may be first mixed in a mixhead upstream of a mold and then injected into the mold. The liquid streams are metered in the desired weight ratio and fed into an impingement mixhead under high pressure, e.g., 2,000-3,000 psig. The liquid streams impinge upon each other in the mixing chamber of the mixhead and the mixture is injected into the mold. One of the liquid streams contains a polyurethane catalyst, as described hereinafter, for the reactive constituents. Once mixed, they react rapidly to gel and then harden to form polyurethane polymers. While the invention will be specifically described in terms of urethane RIM systems, it is contemplated that reaction injection molding processes based on other very rapidly reacting chemical systems can also be utilized.

The isocyanate reactants, isocyanate reactive components, catalysts, and RIM processes are well known in the art and are described, inter alia, in U.S. Pat. Nos. 4,218,543; 4,239,857; 4,254,069; 4,435,349 and 4,792,576, all of which are incorporated herein by reference.

In the RIM process of the instant invention, the viscosity of the materials fed to a mold is from about 50 to about 5,000 cps, preferably from about 150 to about 2500 cps, at injection temperatures varying from room temperature for urethanes to about 150 degrees C. for lactams. Mold temperatures in a RIM process typically range from about 100 degrees C. to about 220 degrees C. The mold pressures generally range from about 1 bar to 100 bar, more particularly 1-30 bar. At least one component in the RIM formulation consists of monomers and adducts thereof that are polymerized to a polymer in the mold.

RIM differs from injection molding in a number of important respects. The main distinction between injection molding and RIM resides in the fact that in RIM, a chemical reaction takes place in the mold to transform a monomer or adducts to a polymeric state. Injection molding is conducted at pressures of about 700 bar to 1400 bar in the mold cavity by melting a solid resin and conveying it into a mold maintained at room temperature and the molten resin at about 150 degrees C. to 350 degrees C. At an injection temperature of about 150 degrees C. to 350 degrees C., viscosity of the molten resin in an injection molding process is generally in the range of 50,000 cps to 1,000,000 cps and is typically about 200,000 cps. In injection molding processes, the solidification of the resins occurs in about 10 to 90 seconds, depending on the size of the molded product. Subsequently, the molded product is removed from the mold. There is no chemical reaction taking place in an injection molding process when the resin is introduced into a mold.

For practical purposes, in a RIM process the chemical reaction takes place rapidly in less than about 2 minutes, generally under about 1 minute.

The skin of the present invention is made by placing a reinforcing mat in a mold cavity and injecting into said mold cavity a formulation capable of forming a reaction injection molded polyurethane resin.

The RIM resin used in the instant invention may be microcellular or solid, but is preferably solid. To form a microcellular RIM resin, a minor amount of a conventional and well known blowing agent (e.g., nitrogen, carbon dioxide, halogenated low-boiling hydrocarbons, etc.) is used to form microcells in the interior portion of the RIM part. In one procedure, about one-third of the RIM part at its center portion has microcells and the outer portions comprise about one-third on each side of the center part, or about two-thirds of the total RIM part is essentially a solid although some microcells are present, diminishing in numbers as the skin is approached. If a solid RIM elastomer is desired, no additional blowing agent is added to the formulation. The densities of the RIM parts suitable in the process of the invention average from about 53 to 97 pounds per cubic foot. Thus, the core containing the microcells may range from about 30 to 90 pounds per cubic foot and the outer portion comprising two-thirds of the RIM part could range from about 65 to 100 pounds per cubic foot. If a solid RIM elastomer is desired, no blowing agent is added and the RIM part density ranges from about 70 to 100 pounds per cubic foot.

The RIM formulation useful in this invention is one which will remain at a reasonably level viscosity until the mold cavity is filled and the reinforcing mat is permeated. This may be achieved by use of RIM formulations which do not gel immediately, e.g., significant gel formation begins about four seconds after mixing of the components. One such formulation is described in U.S. Pat. No. 4,435,349, which is incorporated herein by reference.

This formulation comprises a polyol, a chain extending agent comprising an active hydrogen containing compound of at least 2 functionality, a polyisocyanate and a catalyst consisting essentially of delayed action catalyst(s). The polyols include polyether polyols, polyester diols, triols, tetrols, etc.

The chain extenders include diols and amino alcohols, e.g., low molecular weight linear diols such as 1,4-butanediol and ethylene glycol. Chain extenders which increase the viscosity of the reaction mixture quickly are not useful.

The polyisocyanates include a wide variety of aromatic isocyanates such as p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

The catalysts are so-called delayed action catalysts, e.g., catalysts which catalyze the reaction in from about 4 to about 20 seconds, preferably about 4 to about 15 seconds. One such catalyst or a mixture of delayed action catalysts can be used. The delayed action metal catalysts are preferred, e.g., organotin catalysts such as a stannic diester of a thiol acid (an alkyltin mercaptide). Some of these catalysts are described in U.S. Pat. No. 4,239,857, incorporated herein by reference.

Another such formulation is disclosed in U.S. Pat. No. 4,792,576, which is incorporated herein by reference. This formulation comprises:
(a) an organic polyisocyanate,
(b) a compatible polyol blend comprising
  (i) at least one polyether polyol having a hydroxy functionality of from 2 to 8, preferably 2 to 4, and a molecular weight of from 350 to below 1800, preferably from 350 to 1100, and
  (ii) at least one hydroxyl functional organic material containing from 2 to 8 hydroxyl groups, preferably 2 or 3 and having a molecular weight of below 350, components (b)(i) and (b)(ii) being used in a weight ratio of (b)(i) to (b)(ii) of from about 10:1 to about 1:10, and
  (iii) no more than 45% by weight based on the total weight of component (b), of an active hydrogen containing compound having a molecular weight of 1800 or more.

The RIM formulation may also optionally contain other well known and recognized ingredients such as additional cross-linkers, extenders, pigments, dyes, antioxidants, ultraviolet radiation absorbers, fillers, flame retardant agents, mold release agents, cellulosic fibers, and the like.

The reinforcing mats useful in this invention generally are comprised of fibrous mats and comprise glass mats, graphite mats, polyester mats, polyaramid mats such as KEVLAR ® mats and mats made from any fibrous material. The preferred reinforcing mats are glass mats. The glass mats include random continuous strand mats made of glass fiber bundles, woven mats, and oriented mats such as uniaxial or triaxial mats.

Another reinforcing system that can be used in the practice of the instant invention is a preformed chopped glass strand mat. In this system chopped glass strands are encased in a resin, such as a polyurethane resin, to form a resin-chopped glass strand mat. This mat is then utilized in a manner similar to the afore-described fibrous mats to form the composite skins of the instant invention.

As mentioned supra, it is very important that the RIM formulation be, when injected into the mold, and remain at a reasonable viscosity until the mold cavity is filled and the reinforcing mat is permeated. If the RIM formulation is not initially at a reasonable viscosity or does not remain at a reasonable viscosity, the mat may be displaced from its original position, the mat fibers may be displaced or aligned or oriented, incomplete fill of the mold may occur and/or part distortion may occur due to the mat not being uniformly distributed throughout the finished composite.

This is particularly important with the instant invention due to the relative thinness of the reinforcing mat and the relatively large area of the molds. The thin mats are necessary to produce the relatively thin skins which are from about 0.04 to about 0.2, preferably from about 0.05 to about 0.1, more preferably from about 0.07 to about 0.08 inch thick.

By reasonable viscosity is meant a viscosity wherein the mat and/or mat fibers are not displaced or aligned or oriented, and the mold is completely filled before gelation occurs. Generally, the viscosities should not exceed about 2,500 cps, preferably about 1,500 cps.

In another embodiment of the present invention the composite skins contain a coating on the exterior surface thereof. This coating may be applied by any of the well known coating processes. Preferably it is applied by well known in-mold coating techniques.

In general in the in-mold coating techniques the coating is transferred from the mold surface to the substrate, i.e., composite, during the molding operation and during solidification of the molded part.

One such technique is the high pressure injection in-mold coating process. In this process the composite skin is first partially preformed by placing the reinforcing mat in the mold cavity and then introducing the RIM formulation into the mold cavity. When the RIM formulation is partially cured, e.g., about 30% cured, the coating composition is injected into the mold upon the partially cured composite. Curing of the composite then proceeds normally until the coated and cured composite skin is formed.

Another in-mold coating technique is an in-mold filming process. In this process, a thin film, generally from about 1 to about 5 mils thick, of coating material such as acrylic polymer, vinyl polymer, etc., is drawn over one interior surface of the mold cavity, and is then formed with vacuum assist, onto said interior surface. The composite skin is then formed in the coated mold in the normal fashion.

In yet another in-mold coating technique the molded part is produced by coating the surface of the mold, prior to molding the part, with a coating composition containing a reaction promoter for the reactive molding material, introducing the reactive molding material with the mold containing the fibrous mat, the reaction promoter in the coating being present in an amount sufficient to transfer the coating composition from the mold surface to the substrate and bond it thereto, molding the part and removing the molded part from the mold.

In carrying out this process, the surface of the mold is first uniformly coated with a coating composition containing a reaction promoter for the reactive polymer in an amount sufficient to transfer the coating composition from the mold surface to the molded part and bond it to the latter. The amount of the reaction promoter will normally range from as little as 0.5% to as much as 10% based on the total coating weight. However, amounts of reaction promoter greater than 10% may be used, although normally they are unnecessary, and amounts even less than 0.05% may be adequate if a strong catalyst or other reaction promoter is employed. The coating plus reaction promoter are conveniently applied to the mold surface by spraying the coating at 30 to 60 psig in a solvent at about 10-35% solids content. The mold surface may range from below ambient temperatures to elevated temperatures, e.g., from 50 degrees to 450 degrees F. The mold surface should be from 90 degrees to 180 degrees F. The process of the invention is useful with a wide variety of metal mold surfaces, as for example, steel, aluminum, chrome and nickel plated steel, electroform nickel and kirksite (a zinc alloy) and with other mold surfaces such as epoxy and silicone. Flash time, for evaporation of thinner after coating the mold surface and prior to molding, normally is less than 15 seconds.

Typical non-limiting examples of reaction promoters for polyurethanes are urethane catalysts which may be metal chlorides, amino compounds or organometallic salts such as dibutyltin dilaurate, stannous octoate or phenyl mercuric propionate.

A more detailed description of this in-mold coating process is as follows. The two liquid components used in reaction are polyol and isocyanate. The two liquid streams, one isocyanate and the other polyol, are metered exactly in the desired weight ratio and fed into an impingement mixhead under 2,000-3,000 psig pressure. The two reactive high pressure liquid streams impinge upon each other in the mixing chamber of the mixhead and the resulting mixture is forced into the mold cavity.

Prior to the injection in the mold, the mold is cleaned thoroughly, brought to the desired molding temperature, which is in most cases between about 140 and about 200 degrees F. The mold cavity and/or core surface is coated with the coating composition by spraying with a spray gun to give a desired coating thickness, which may vary from 0.1 to 2.5 mils or more but normally is less than about 2.0 mils with a fibrous reinforcement as filler. A flash off time to evaporate the solvent of 10 to 15 seconds is allowed to dry off the coating.

The reinforcing mat is laid in the cavity or is attached to the core part of the mold after the coating is applied onto the mold. If desired, means can be provided in the mold to hold the mat. A double parting line can also be provided to the mold, if required, to avoid any leakage of the urethane material and for proper sealing. Then the mold is closed and held under 50 to 600 tons of clamping force in a mechanical clamp. The reaction mixture is injected from the mixhead attached to the mold. The reaction mixture flows into the mold, and encapsulates the mat reinforcement and simultaneously is coated with the coating which was sprayed onto the mold surface. The reactive mixture solidifies and takes the shape of the mold. The part is demolded in seconds to a few minutes depending upon the cure time. The reinforcement and coating become an integral part of the mold part.

Further disclosure of the details of the in-mold coating process and its applicability to reaction injection molding processes may be obtained from U.S. Pat. No. 4,282,285 which is incorporated herein by reference.

The coating may be any decorative or protective coating of the type applied by conventional coating technology to molded parts. The coatings may be either a thermoplastic or thermosetting polymer, with or without a plasticizer. The coating should of course be capable of withstanding the molding temperatures without decomposing or deteriorating. Among the useful coatings included within the foregoing description are, for example, acrylic and acrylic ester polymers, prereacted or blocked urethane polymers, saturated and unsaturated polyesters, epoxy esters, cellulose esters, polyolefins, vinyl and vinyl-melamine polymers and mixtures of the foregoing polymers with each other or with other coating compositions. A preferred class of coatings are those based on urethane or acrylic polymers. The coating may be used either as a protective coating or with a pigment as a paint coating or it may contain cellulosic materials such as cellulosic fibers to enhance stainability.

Due to the rheological characteristics of the RIM resin composition, e.g., its wetting of the fibrous mat, the outer surfaces of the composite are comprised substantially of the resin, i.e., the mat lies below the top surfaces and said surfaces are substantially free of the fibers forming the fibrous mat. Thus, the top or outer surfaces are smooth, substantially fiber free and may be painted or dyed. Alternately, as discussed herein, the coating may be applied onto the outer surfaces, preferably the exposed top surfaces, of the composite skins.

In yet another and preferred embodiment of the instant invention, a texture such as a texture simulating both the texture and graining of wood, is molded in the surfaces of the composite skins, either coated or uncoated. The textured surface may be molded only on the exterior side of each skin, or it may be molded on both the exterior and interior sides of each skin.

Alternatively, a wood grain texture may be molded on the exterior side of the composite skin while a random texture, which aids in the adherence of the skin to the foam core, may be molded into the interior side of the composite skin.

The texturing is accomplished in a conventional and well known manner such as by having the inner surfaces of the mold textured and/or grained to transfer said textured and grained patterns to the surfaces of the composite skins.

The plastic foams of which the core 30 is comprised are the well known and conventional rigid plastic foam such as, for example, polyurea foams, polyolefin foams, polystyrene foams, phenolic foams, and polyurethane foams. Preferred foams are the polyurethane foams.

Rigid polyurethane foams are well known and are commonly prepared from organic polyisocyanates and organic polyols together with known blowing agents, surfactants and catalysts. Such foams are used in construction, refrigeration and insulation applications because they are closed cell foams. These foams, along with methods for their preparation, are disclosed, inter alia, in Plastics Handbook Volume 7, Polyurethanes, edited by R. Vieweg and A. Hoechtlen, pgs. 405 ff. (Verlag Car Hansen, Munich, 1966); and U.S. Pat. Nos. 4,544,679; 4,945,119 and 4,940,632, all of which are incorporated herein by reference.

The rigid closed cell foam compositions may optionally contain other well known and conventional ingredients such as extenders, anti-obidants, flame retardent agents, fillers, and the like.

The rigid polystyrene foams are described, inter alia, in U.S. Pat. Nos. 4,476,077 and 3,444,283, and in Modern Plastics Encyclopedia, Vol. 52, No. 10A, McGraw-Hill, Inc., New York, N.Y. (1975), all of which are incorporated herein by reference.

A door assembly according to the instant invention is constructed as follows:

The frame 11 comprises two rails, a top rail 14 and a bottom rail 15 each comprised of three pieces 14a-14c and 15a-15c of finger-jointed pine, each piece being about 1⅜ inches wide and about 1 5/16 inches thick, bonded together by adhesive; a first stile 12 in which is mounted the lock mechanism comprised of three pieces 12a-12c of finger-jointed pine, each piece being about 1⅜ inches wide and about 1 5/16 inches thick, bonded together by adhesive; and a second stile 13 comprised of a single piece of finger-jointed pine about 1⅜ inches wide and about 1 5/16 inches thick.

Inside the frame is a polystyrene foam core 30 having a density of about 2 lbs./ft$^3$. The two skins 21, 22, about 0.07 to about 0.08 inches thick, are adhered to opposite sides of the frame and core by a polyurethane hot melt moisture cure adhesive marketed by National Starch Corp. as #70.7254. The skins are comprised of about 30% by weight of a continuous strand glass mat (2 ounces per ft.$^2$, available from Owens-Corning). The resin is a RIM polyurethane resin available from Mobay Corp. as BAYDUR STR 400. This neat resin has a specific gravity of 1.22, a flexural modulus of 395 ksi, a tensile strength of 5,500 psi, and a Izod impact of 1.8 ft-lb/in.

This door assembly is capable of meeting "Grade 30" requirements for "Door Impact" of ASTM F 476-76, Standard Test Methods for Security of Swinging Door Assemblies, incorporated herein by reference. ASTM F 476-76 includes impacting the door with a door ram pendulum system with a cylindrical weight capable of delivering horizontal impacts of up to 148 ft. lbs. The various "Grades" have the following requirements:

| "Grade 10 | Grade 20 | Grade 30 | Grade 40 |
|---|---|---|---|
| two blows of 59 ft. lbs. | Grade 10 requirements plus two blows of 89 ft. lbs. | Grade 20 requirements plus two blows of 118 ft. lbs. | Grade 20 requirements plus two blows of 148 ft. lbs." |

The afore-described door assembly meets grade 30 requirements. Upon one blow of 148 ft. lbs. as required by Grade 40, the door experienced a lock failure, i.e., the lock failed. There were no cracks in the skin of the door, nor was there any splintering, cracking or breakage of the wood in the stile in which the lock was mounted. Thus, the door assembly did not fail. The test was terminated after one blow of 148 ft. lbs. because of the failure of the lock.

The ability of this door assembly to meet at least Grade 30 requirements is due to the particular combination of the multi-ply construction of the frame, the core, and the composite skins which are able to absorb impact without breaking or cracking. These properties of the skins include, inter alia, a relatively high flexural modulus and tensile strength. Thus, for example, a 49% glass reinforced RIM polyurethane (BAYDUR STR 400 marketed by Mobay Corp.) has a tensile strength of 28,000 psi, a tensile modulus of 1,600 ksi, a flexural modulus of 1,500 ksi, a flexural strength of 41,000 psi, and an Izod impact of 23 ft. lb./in.

In one method of assembling the door assembly of the instant invention the frame 11 is first assembled from the stiles 12, 13 and rails 14, 15 with the ends thereof being secured by adhesives, fasteners, or both, preferably fasteners. A preformed foam core 30 is then inserted into the cavity defined by the frame and secured to the frame by adhesives, fasteners, or both, preferably fasteners. The skins are preformed, an adhesive such as a hot melt adhesive is coated into the inner surface 27 of the skins, and the skins are then assembled to the frame 11 containing the core 30.

The skins 21, 22 are generally larger than the frame 11 and extend outwardly of the edges of the frame. Following firm adhesion of the skins 21, 22 to the frame 11 and core 30, the assembled doors are then trimmed. Trimming is accomplished by two cutting tools positioned on each side of the door assembly and cutting inwardly toward the center of the door. Each tool makes only a partial cut. This is done, inter alia, to prevent possible delamination of the skins from the frame and the core.

As illustrated in FIGS. 6 and 7 the edges of the skins are trimmed to be even with the edges of the rails. As illustrated in FIGS. 3 and 4, the stiles are trimmed to extend outwardly from the edge of the skins.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

I claim:

1. A door assembly comprising:
   (i) a frame containing two opposite sides, a top rail, a bottom rail, a first stile adapted to receive a lock mechanism, and a second stile adapted to receive at least one hinge;
   (ii) a core comprised of plastic foam disposed within said frame; and
   (iii) a skin having comprised of reaction injection molded resin having an exterior surface and an interior surface disposed on each of said opposite sides of said frame covering substantially all of said frame and said core and adhered to at least said frame.

2. A door assembly according to claim 1 wherein said top rail and said bottom rail are comprised of at least two plies of wood bonded together.

3. A door assembly according to claim 2 wherein said top rail and said bottom rail are each comprised of three plies of wood bonded together.

4. A door assembly according to claim 1 wherein said first stile is comprised of at least two plies of wood bonded together.

5. A door assembly according to claim 4 wherein said first stile is comprised of three plies of wood bonded together.

6. A door assembly according to claim 1 wherein said skin is comprised of a composite comprising a fibrous mat reinforced reaction injection molded resin.

7. A door assembly according to claim 6 wherein said reaction injection molded resin comprises polyurethane.

8. A door assembly according to claim 7 wherein a thin coating is coated on said exterior surface of said skin.

9. A door assembly according to claim 8 wherein said coating is applied to said exterior surface of said skin by in-mold coating process.

10. A door assembly according to claim 7 wherein said exterior surface of said skin has a textured pattern simulating the grain and texture of wood.

11. A door assembly according to claim 8 wherein said coated exterior surface of said skin has a textured pattern simulating the grain and texture of wood.

12. A door assembly according to claim 10 wherein said interior surface of said skin has a textured pattern effective to promote adhesion of said skin to said frame and core.

13. A door assembly according to claim wherein said interior surface of said skin has a textured pattern effective to promote adhesion of said skin to said frame and core.

14. A door assembly comprising, in combination:
 (i) a perimeter frame comprised of wood defining a central cavity;
 (ii) a core comprising a plastic foam disposed in said cavity; and
 (iii) a pair of opposed skins comprised of glass fiber mat reinforced reaction injection molded resin mounted on said frame.

15. A door assembly according to claim 14 wherein said frame is rectangular in shape.

16. A door assembly according to claim 15 wherein said frame is comprised of a top rail, a bottom rail, a first stile, and a second stile.

17. A door assembly according to claim 16 wherein said top rail and said bottom rail are comprised of at least two wood plies bonded together.

18. A door assembly according to claim 17 wherein said top rail and said bottom rail are comprised of three wood plies bonded together.

19. A door assembly according to claim 16 wherein at least one of said first stile and said second stile is comprised of at least two wood plies bonded together.

20. A door assembly according to claim 19 wherein at least one of said first stile and said second stile is comprised of three wood plies bonded together.

21. A door assembly according to claim 15 wherein said reaction injection molded skins are comprised of reaction injection molded polyurethane resin.

22. A door assembly according to claim 15 wherein said foam core is comprised of polyurethane foam or polystyrene foam.

23. A door assembly according to claim 21 wherein said skins have an exterior surface, said exterior surface having a molded texture pattern.

24. A door assembly comprising:
 (i) a wooden rectangular perimeter frame having two sides comprised of (a) a top rail comprised of a plurality of wood plies, (b) a bottom rail comprised of a plurality of wood plies, (c) a first stile adapted to receive a latch mechanism comprised of a plurality of wood plies, and (d) a second stile adapted to receive at least one hinge;
 (ii) a foam core positioned within said frame; and
 (iii) a composite skin having an exterior surface and an interior surface mounted on each of said sides of said frame, said composite skin comprising a fibrous mat impregnated with a reaction injection molded resin.

25. A door assembly according to claim 24 wherein said top rail is comprised of three plies.

26. A door assembly according to claim 24 wherein said bottom rail is comprised of three plies.

27. A door assembly according to claim 24 wherein said first stile is comprised of three plies.

28. A door assembly according to claim 24 wherein said reaction injection molded resin is comprised of polyurethane resin.

29. A door assembly according to claim 28 wherein said fibrous mat is comprised of a glass mat.

30. A door assembly according to claim 24 wherein said fibrous mat is comprised of a glass mat.

31. A door assembly according to claim 24 wherein said foam core is comprised of polystyrene foam.

32. A door assembly according to claim 24 wherein said foam core is comprised of polyurethane foam.

33. A door assembly according to claim 24 wherein said exterior surface of said skin is textured.

34. A door assembly according to claim 33 wherein said interior surface of said skin is textured.

35. A door assembly according to claim 24 wherein said interior surface of said skin is textured.

36. A door assembly according to claim 24 wherein said exterior surface of said skin is coated with a thin coating.

37. A door assembly according to claim 36 wherein said coated exterior surface of said skin is textured.

38. A door assembly according to claim 37 wherein said interior surface of said skin is textured.

39. A door assembly according to claim 30 wherein said composite skin is comprised of about 25 to about 35% glass mat.

* * * * *